June 29, 1965 R. R. PARKS 3,191,993
SEAT BELT ASSEMBLY
Filed July 31, 1962 2 Sheets-Sheet 1

INVENTOR.
Robert Ray Parks
BY J. L. Carpenter
ATTORNEY

June 29, 1965  R. R. PARKS  3,191,993
SEAT BELT ASSEMBLY
Filed July 31, 1962  2 Sheets-Sheet 2

INVENTOR.
Robert Ray Parks
BY
J. R. Carpenter
ATTORNEY

United States Patent Office 3,191,993
Patented June 29, 1965

3,191,993
SEAT BELT ASSEMBLY
Robert R. Parks, Ferndale, Mich., assignor to General Motors Corporation, Detroit, Mich., a corporation of Delaware
Filed July 31, 1962, Ser. No. 213,798
3 Claims. (Cl. 297—388)

This invention relates to a seat belt assembly for vehicles and more particularly to an assembly which provides for retraction of the seat belt when it is not in use and storage of the retracting means.

Recently, seat belts have been used more extensively in automobiles to protect passengers and operators from injury during accidents or sudden stops of the vehicle. The commonly used seat belt is generally a two-piece belt with one end of each piece secured to the vehicle floor. A buckle is provided on the open ends for securing the seat belt after the user is seated. Due to the various sizes of the potential users, seat belts of necessity must be adjustable. In achieving the required adjustability, generally one of two methods is used. First, a pass-through buckle is secured to one of the free ends of the seat belt and the mating end from the other part of the seat belt passes through the belt buckle until the proper fit is accomplished at which time the buckle is closed securing the seat belt. The second method has a two-part buckle with one part attached to each free end of the belt. To accommodate the various length requirements for this type belt, an adjustable means for attaching the seat belts to the buckle is provided. In either of these common methods, there is generally a loose end when the seat belt is in place. Another inconvenience of the present seat belts is having the unattached seat belts lying loose on the seat or floor when not in use.

An object of this invention is to provide a seat belt which may be easily stored when not in use. A further object of this invention is to provide a seat belt which is easily and conveniently adjustable to accommodate the occupant of the seat. Another object of this invention is to provide a seat belt which will secure the passengers or occupants in their seats and also prevent inadvertent opening of the adjoining vehicle door. Seat belt storage means are provided by this invention which may be removed from view when the seat belt is not in use.

These and other objects, advantages and features of the invention will become fully apparent as reference is had to the accompanying specification and drawings wherein.

Figure 1:
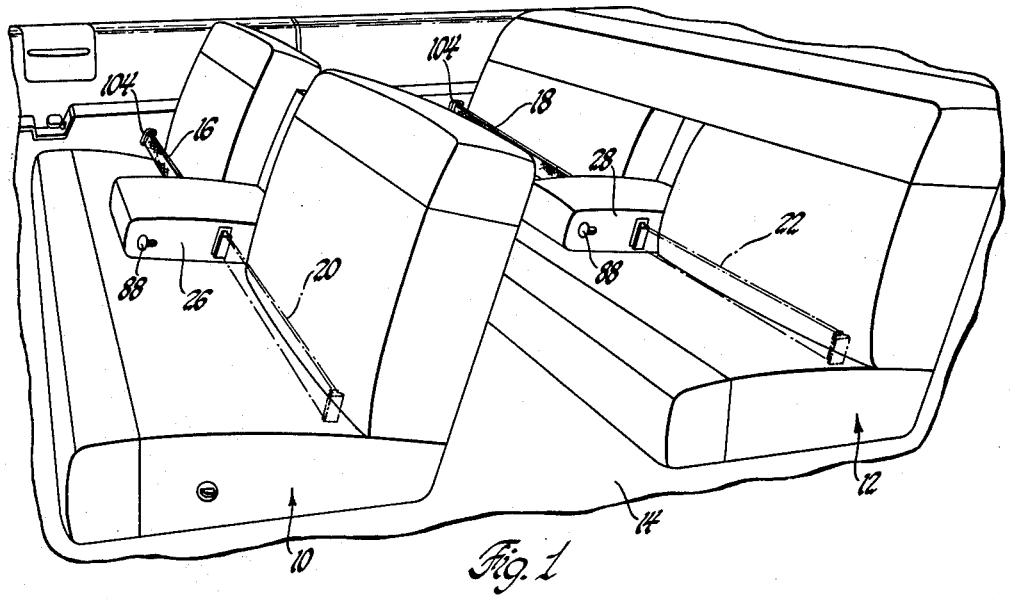
FIGURE 1 is a perspective view illustrating the seat belt construction of the present invention installed in a front and rear seat assembly of an automobile.

As seen in FIGURE 1, a front seat assembly 10 and a rear seat assembly 12 are mounted on the vehicle body 14. The right front seat belt 16 and the right rear seat belt 18 are shown in the operative position while the left front seat belt 20 and left rear seat belt 22 are shown in the retracted position. Phantom lines show the left front seat belt 20 and the left rear seat belt 22 in their operative position the left door being omitted.

The seat belt storage unit, indicated generally by numeral 24, was designed to be installed in the arm rest or bolster 26 of the front seat or arm rest 28 of the rear seat. Thus, when the seat belts are not in use, the arm rest may be rotated into the cavities of the seat back to form a portion of the seat back in the conventional manner.

Figure 2:
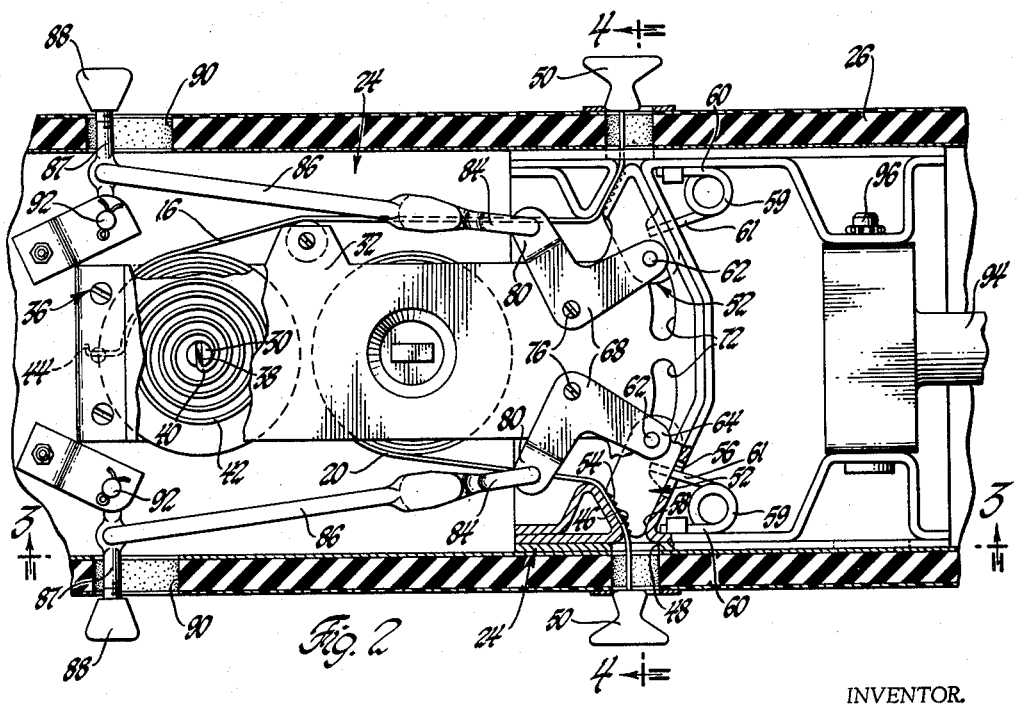
FIGURE 2 is a plan view of the seat belt retracting mechanism partly in section, with parts broken away, as it is installed in the center bolster of the front seat.
Figure 3:
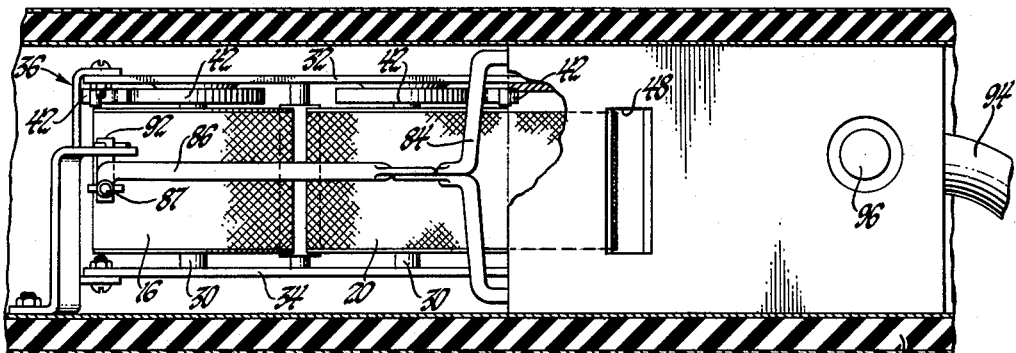
FIGURE 3 is a view taken substantially along lines 3—3 in the direction of the arrows, as seen in FIGURE 2, showing the storage rolls of the seat belt retracting means.
Figure 4:
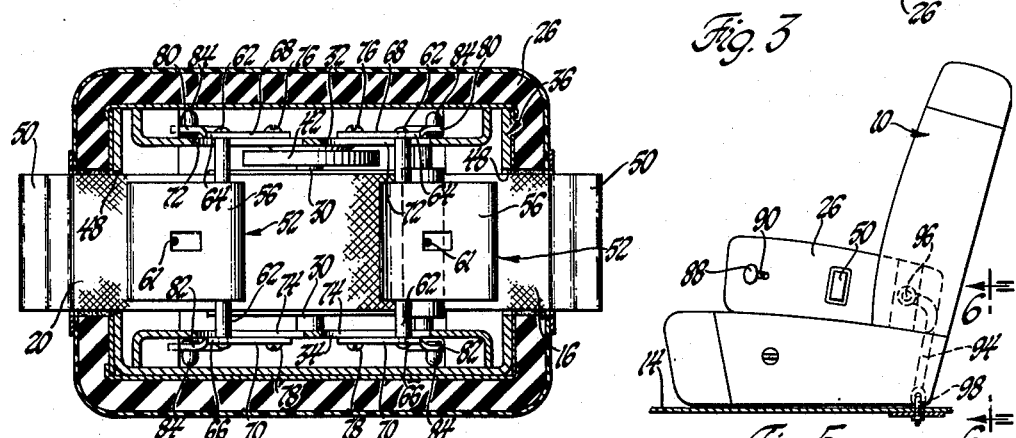
FIGURE 4 is a view taken substantially along the lines 4—4 in the direction of the arrows, as seen in FIGURE 2, showing the seat belt means and clamping wedges.

As seen in FIGURES 2, 3 and 4, the seat belt storage means 24 consists of independent retracting means for the right and left hand seat belts 16, 20. For ease of explanation only the operation of the left from seat belt will be explained. Where applicable, duplicate numbers will be used for similar parts of the right hand seat belt retracting means.

One end of the seat belt 20 is secured to the roller 30 which is rotatably mounted in an upper plate 32 and a lower plate 34 of the storage assembly frame 36. In the stored position, seat belt 20 is wound about roller 30. The upper end of the roller 30 has a slot 38 in which one end 40 of a motor spring 42 is mounted. The other end 44 of motor spring 42 is securedly fastened to the storage assembly frame 36 by a screw or other suitable means. The motor spring 42 is mounted so that as the seat belt 20 is unwound from about the roller 30 the motor spring 42 will be loaded and will bias the seat belt to rewind around roller 30. The seat belt 20 is threaded from its coiled position about roller 30 along a guide surface 46 of the frame 36 and out through opening 48 in the side of the storage assembly 24. Attached to the free end of the seat belt 20 is an anchor bar or handle 50 which is grasped to pull the seat belt 20 to its operatnig position.

The handle 50 is larger than opening 48 and acts as a stop means when the seat belt 20 is retracted within the storage assembly. A locking wedge 52 is positioned inside opening 48. The locking wedge 52 has a serrated surface 54 parallel and adjacent to guide surface 46 and a sliding surface 56 parallel to and in sliding contact with guide wall 58 of assembly frame 36. A torsion spring 59 has one arm 60 secured to assembly frame 36 and the other arm 61 contacting locking wedge 52. The torsion spring 59 exerts a biasing force on wedge 52 along guide wall 58 toward guide surface 46.

As the belt 20 is threaded to opening 48 it passes between guide surface 46 and the serrated surface 54 of locking wedge 52. Normally, the biasing force of spring 59 on wedge 52 urges serrated surface 54 into contact with the seat belt 20 and presses it against guide surface 46 locking the belt 20. The locking wedge 52 is rotatably mounted on wedge pin 62, which guides its movement along wall 58. The ends of pin 62 are pivotally connected to arms 64, 66, respectively, of upper and lower bellcranks 68, 70. Between wedge 52 and the bellcrank arms 64, 66 the pin 62 passes through control slots 72, 74 of frame plates 32, 34. The control slots 72, 74 limit the movement of pin 62.

The fulcrums of bellcranks 68, 70 are pivotally attached to the plates 32, 34 by screws 76, 78. The other arms 80, 82 of bellcranks 68, 70 are pivotally connected to yoke member 84. One end of control arm 86 is attached to the mid-section of yoke 84 by welding or other suitable means. The other end of control arm 86 is pivotally connected to the shaft 87 of control handle 88. The control handle 88 extends through opening 90 of the storage assembly and is pivotally connected to the storage frame 36 by pivot section 92 of shaft 87.

By reference to FIGURE 2, it can be seen that rearward movement of the control handle 88 is transmitted through control arm 86 and yoke 84 to the bellcranks 68, 70. As the bellcranks are moved about their fulcrums at 76, 78, the locking wedge 52 is moved away from opening 48 and contact with belt 20 by pin 62. When the force of spring 59 is overcome and the wedge 52 moved inboard, then the belt 20 is free to move.

Figure 5:
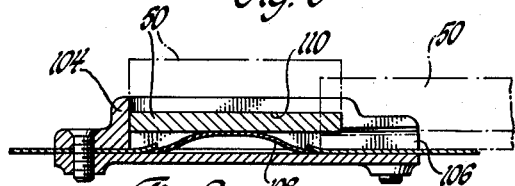
FIGURE 5 is a side view of the front seat with the seat belt storage means in operating position showing the anchoring and pivoting means for the front bolster.
Figure 6:
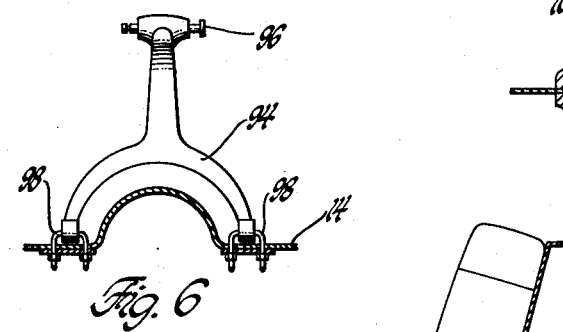
FIGURE 6 is a view taken substantially along the lines 6—6 in the direction of the arrows, as seen in FIGURE 5, which shows the anchor yoke and the manner in which it is attached to the vehicle floor.
Figure 7:
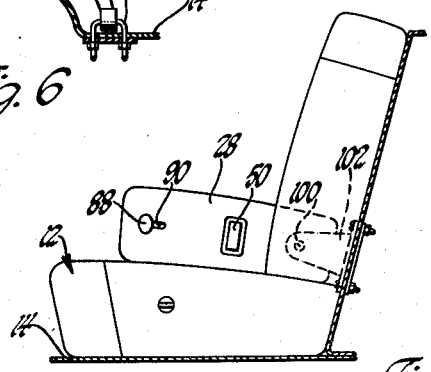
FIGURE 7 is a side view of a rear seat with the seat belt storage means in operating position showing the anchoring and pivoting means for the rear bolster.

The storage assembly 24 and arm rest 26 are pivotally connected to the vehicle body 14 by a yoke member 94. As seen in FIGURES 5 and 6, the front storage assembly 24 mounted in arm rest 26 is pivotally connected to yoke member 94 by a pin 96. The yoke member 94 is pivotally connected to the vehicle body 14 by U bolts 98 or other suitable means. This pivotal connection is provided so that the front seat assembly 10 may be adjusted for and aft in the conventional manner without the anchored storage assembly affecting such movement. Storage assembly 24, for the rear seat, is mounted in arm rest 28, as seen in FIGURE 7. For the rear seat, the storage assembly 24 is pivotally connected by pin 100 to a support bracket 102 which is securely fastened to the vehicle body 14 by bolts or other suitable means, since the rear seat normally is not adjustable.

Figure 8:
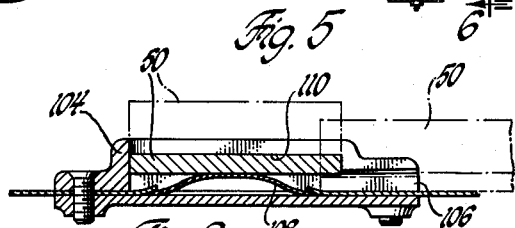
FIGURE 8 is a cross-sectional view of the door anchoring plate, partially in section, showing the entering and operating positions of the belt anchor bar in phantom lines.
Figure 9:
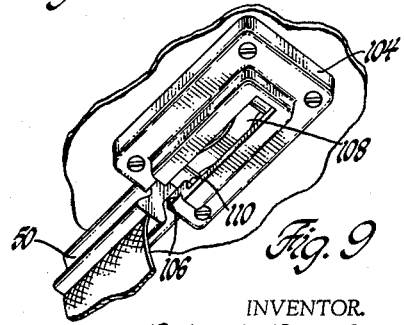
FIGURE 9 is a perspective view of the anchoring plate with the anchor bar of the seat belt about to be inserted.

An anchor plate 104, as seen in FIGURES 8 and 9, is provided for each seat belt. For the front seat belts 16, 20, the anchor plates 104 are mounted in the doors adjacent the seat. Depending upon the body style, the anchor plates 104 for the rear seat belts 18, 22 are mounted either in the doors or the side walls of the vehicle adjacent the seat. If a door is adjacent the seat, the seat belt serves a dual purpose of securing the occupant in the seat as well as securing the door from flying open during an accident.

The anchor plate 104 is adapted to receive the anchor bar 50 through an opening 106 on the lower end of the anchor plate. A flat spring 108 in the anchor plate 104 is provided to bias and retain the anchor bar 50 in locked engagement in the rectangular recess 110 of anchor plate 104.

To secure the anchor bar 50 in operating position, the edge of bar 50 is inserted in opening 106 and then by sliding the bar through the opening into the anchor plate 104, the spring 108 is depressed. After the bar 50 has been inserted until it is positioned below the recess 110, the spring 108 will move the bar 50 into the recess 110 and hold it there in operating position.

When the arm rest is in the down position, as seen in FIGURES 1 and 2, to use the seat belt, the control handle 88 is moved to the rear in opening 90. Movement of control handle 88 pivots shaft 87 about section 92 causing arm 86 and yoke 84 to move the bellcranks 68, 70 to the rear about their pivot point at 76, 78. As bellcranks 68, 70 pivot, their arms 64, 66 move wedge pin 62 along guide slots 72, 74 which in turn move wedge 52 away from opening 48. As wedge 52 is moved inward away from opening 48, the biasing force of torsion spring 59 is overcome. The inward movement of wedge 52 frees belt 20 and the seat belt 20 may be unrolled from about roller 30 by grasping handle 50 and pulling away from the opening 48.

When a sufficient length of the seat belt has been unrolled, the handle or anchor bar 50 is then inserted in the anchor plate 104 to lock the free end of the seat belt in operating position. Any slack in the seat belt will be rewound around pin 30 by the energy stored in the motor spring 42 by the unrolling action of the seat belt. Handle 88 is then released and the torsion spring 59 moves the wedge 52 towards opening 48 and the serrated edge 54 presses seat belt 20 to surface 46. The teeth of serrated surface 54 are sloped to bite into the seat belt and prevent further unrolling by forces outside the storage member. A pull on the seat belt from outside the storage assembly will draw the wedge 52 towards opening 48 by the biting action of the wedge teeth. In this manner, the seat belt is locked from unrolling due to external forces.

To release the seat belt, the handle 88 is again moved to the rear in opening 90. This action releases the wedge 52 and allows free movement of the seat belt. To release the handle, or lock bar, 50 from locked position in anchor plate 104, the handle is pressed toward the outside of the vehicle compressing spring 108 and moving the handle out of the rectangular opening 110. Then the handle is moved through opening 106 out of engagement with the anchor plate. The motor spring 42 will then retract the seat belt about roller 30 to its proper stored position.

While but one embodiment of the invention has been shown and described, it will be evident that numerous changes and modifications may be made therein. It is, therefore, to be understood that it is not intended to limit the invention to the embodiments shown but only by the scope of the claims which follow.

I claim:

1. In a motor vehicle having a seat mounted therein, said vehicle provided with an arm rest, support means connected to said vehicle and supporting said arm rest, reel means rotatably mounted in said support means, said seat belt secured at one end to said reel means and adapted to be wound thereon and unwound therefrom, spring means connected between said reel means and said support means and normally, yieldingly, urging said reel means in a winding direction, locking means movably mounted in said support means, said support means comprising guide means providing a guide for said seat belt and a stop for said locking means, said locking means normally biased to a locked position with said seat belt extending between said guide means and said locking means, said locking means including a toothed wedge engaging said seat belt when said locking means is in said locked position whereby attempted extension of said belt causes said locking means to be drawn more positively into engagement with said belt, actuator means coupled to said locking means and adapted to actuate said locking means to an unlocked position to permit said seat belt to be unwound from said reel means.

2. In a motor vehicle having a seat mounted therein, said seat provided with an arm rest, support means connected to said seat and supporting said arm rest, reel means rotatably mounted in said support means, said seat belt secured at one end to said reel means and adapted to be wound thereon and unwound therefrom, latch means connected to the other end of said seat belt and adapted to engage cooperating latch means mounted in said vehicle, spring means connected between said reel means and said support means and normally, yieldingly, urging said reel means in a winding direction, said support means having a slot therein, a locking wedge mounted for movement in said slot, linkage means pivotally mounted in said support means and pivotally connected to said locking wedge, a manually manipulatable actuator arm also pivotally connected to said linkage means and adapted to actuate said locking wedge from a locked position to an unlocked position, said locking wedge normally spring biased to said locked position, guide means formed in said support means to provide a guide for said seat belt during winding and unwinding thereof and providing stop means for said locking wedge, said locking wedge operable when in said locked position to prevent withdrawal of said seat belt from said device.

3. In a motor vehicle having a seat mounted therein, said seat provided with an arm rest intermediate the ends thereof, support means pivotally connected to said seat and supporting said arm rest, reel means rotatably mounted in said support means, a seat belt secured at one end of said reel means and adapted to be wound thereon and unwound therefrom, spring means connected between said reel means and said support means and normally, yieldingly, urging said reel means in a winding direction, said support means having an arcuate slot therein and guide means formed thereon, a locking wedge mounted in said slot, said guide means forming a guide for said seat belt during winding on and unwinding from said reel means and providing stop means for said locking wedge, linkage means pivotally mounted in said support means and pivotally connected to said locking wedge, an actuator arm pivotally connected to said linkage means and adapted to actuate said locking wedge from a locked position to an unlocked position, said locking wedge normally spring biased to the locked position with said seat belt extending between said guide means and a portion of said locking wedge, said portion being serrated whereby attempted extension of said seat belt while said wedge is in a locked position causes said wedge to be drawn more tightly into engagement with said seat belt.

References Cited by the Examiner
UNITED STATES PATENTS

| | | | |
|---|---|---|---|
| 2,071,903 | 2/37 | Shively | 297—386 |
| 2,434,119 | 1/48 | Nordmark | 297—388 |
| 2,480,915 | 9/49 | George | 297—388 |
| 2,622,293 | 12/52 | Wermlinger | 24—170 |
| 2,852,270 | 9/58 | Hunt | 297—388 |
| 2,855,028 | 10/58 | Matthews | 297—388 |
| 2,947,353 | 8/60 | Wimmersperg | 297—388 |
| 2,971,730 | 2/61 | Martin | 244—122 |
| 3,020,089 | 2/62 | Monroe | 297—388 |

FRANK B. SHERRY, *Primary Examiner.*